A. J. BROWN.
FLOW INDICATOR.
APPLICATION FILED JAN. 2, 1920.

1,385,973.

Patented July 26, 1921.

Inventor
A. J. Brown
by
Attorney

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

FLOW-INDICATOR.

1,385,973.  Specification of Letters Patent.  Patented July 26, 1921.

Application filed January 2, 1920. Serial No. 349,654.

*To all whom it may concern:*

Be it known that I, ARTHUR J. BROWN, a citizen of the United States, residing at Milwaukee, in the county of Milwaukee and State of Wisconsin, have invented a certain new and useful Improvement in Flow-Indicators, of which the following is a specification.

This invention relates in general to apparatus for indicating, in a visual manner, the presence or absence of the flow of fluid through conduits, and has particular relation to apparatus of this general character of special utility in indicating the flow of fluid through conduits of a lubricating system.

It is an object of this invention to provide indicating apparatus of improved design which is of comparatively simple and inexpensive construction and of great utility in readily indicating the presence or absence of the flow of fluid through a conduit.

It is a further object of this invention to provide an indicating apparatus of this general character which is of simple construction and design and of extreme utility in indicating the presence or absence of the flow of fluid through a conduit and also, to a considerable extent, the rate of such flow.

These and other objects and advantages are attained by this invention, the various novel features of which will appear from the description and drawings, disclosing several embodiments of this invention, and will be particularly pointed out in the claims.

Figure 1:
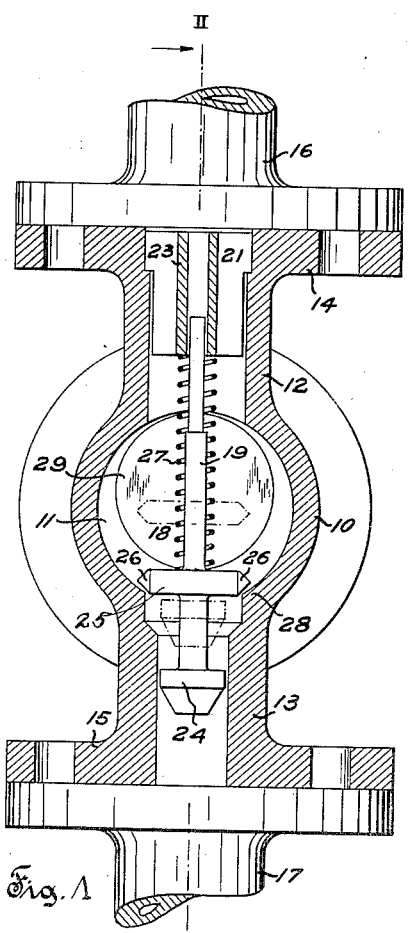
Figure 1 is a sectional elevation of an embodiment of this invention, the sectional plane being that of the line I—I of Fig. 2.
Figure 2:
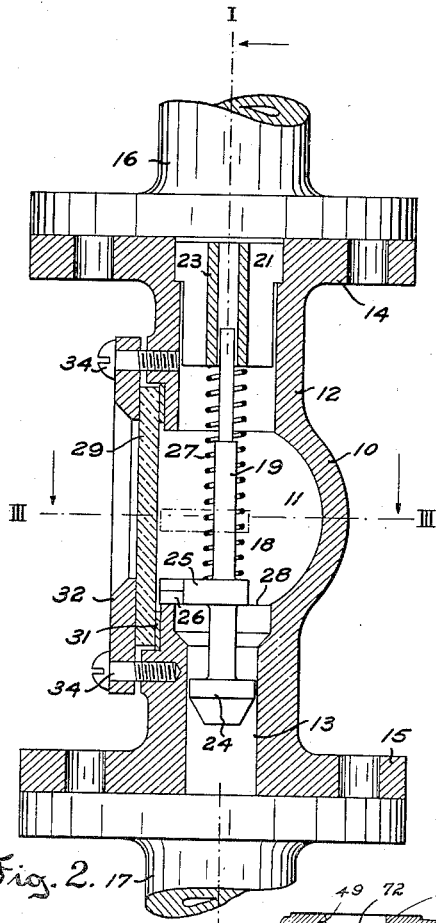
Fig. 2 is a sectional elevation along the line II—II of Fig. 1.
Figure 3:
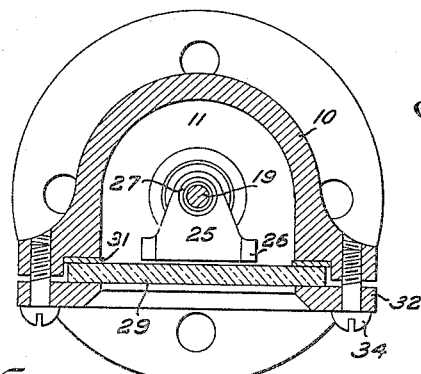
Fig. 3 is a sectional plan along the line III—III of Fig. 2.

In the embodiment of the invention disclosed in Figs. 1, 2 and 3, a casing element 10 is provided with a central enlarged recessed portion 11 and tubular extensions 12 and 13, these tubular extensions being provided at their ends with means for coupling the casing to adjacent sections of a pipe line, the specific means for connecting the casing in operative position being here shown as integral and apertured flanges 14 and 15 designed for attachment to similar flanges of the pipe sections 16 and 17.

Located within the recessed body portion of the casing 10 is an indicator 18 having a vertically arranged stem 19. Secured in position at the upper portion of the tubular extension 12 is a guide member 21, preferably in the form of a bushing apertured or vaned so as to afford the least obstruction to the flow of fluid through the tubular extension and having a centrally located sleeve or bushing 23 within which the upper end of the stem 19 is slidable with a fairly close guiding fit. This guide element 21 is suitably held in the position shown in the drawings, preferably by being threaded or brazed therein. At the lower end of the stem 19, the indicator is provided with a plunger 24 having a comparatively close fit within the through opening in the tubular extension 13 and provided with a conical extension at its lower end, as indicated. In the inoperative position of the indicator, as shown in full lines in Figs. 1 and 2, this plunger is an appreciable distance below a counterbored portion at the upper end of the tubular extension 13. Mounted on the stem 19 above the plunger 24 is the indicating element proper 25 which, in the form shown, is laterally extended at the front edge thereof, with one or both end portions of this front edge beveled to a comparatively sharp point, thus forming what may be considered as indicating pointers, as shown at 26. A compression spring 27 is disposed between the lower end of the guide brushing 23 and the upper face of the indicating element 25, this spring biasing the indicating element to the position shown in full lines in the drawings, wherein the plunger 24 is well within the tubular extension 13. Portions of the indicating element adjacent the parts 26 may engage portions of the casing and thus act as a stop limiting downward movement of the indicating element, this feature being indicated at 28.

The front side of the casing 10 is closed by a transparent sight glass 29 clamped in position against a shouldered portion of the casing as indicated, preferably through the intermediary of a flexible washer 31, the sight glass being held in operative position by a clamping ring 32 suitably held in operative position, as by means of screws 34.

In the inoperative position of the indicating element, shown in full lines 1 and 2, the indicating element is preferably below the portion of the sight glass covered by the lower part of the clamping ring 32, and hence is invisible. In operative position, that is, when oil is flowing through the conduit within which the indicator is disposed, the direction of such flow being upward in the form shown, the fluid, acting against the plunger element 24, is effective to lift the indicating element to the dotted line position shown in Fig. 1, the position of the indicator at this time and the amount of fluid passing between the cone-shaped lower end of the plunger and the wall of the casing being proportional to the pressure of the fluid, thus indicating not only the presence of flow, but also, to a certain degree, the amount of such flow. At this time, the indicating element 25 with its pointers 26 are opposite an unobstructed portion of the sight glass, thus giving the desired visual indication as to the flow of fluid through the conduit.

Due to the fact that the indicating element 25 is normally held in inoperative position by the spring 27, it will be apparent that this indicating element will occupy its normal position independently of whether the indicator is located in a vertical, horizontal or inclined pipe line, and hence the indicator is effective to give the desired indication under any of these conditions; and this will be the case also if the casing 10 is connected in the pipe line inverted so as to indicate flow through the pipe line in a direction opposite to that shown.

Figure 4:
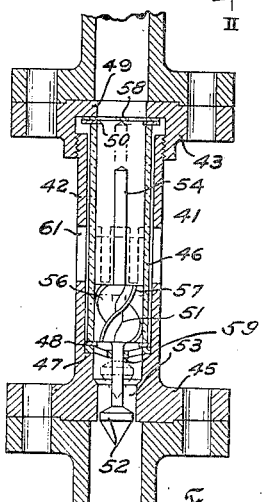
Fig. 4 is a sectional elevation showing a modification of the form of the invention disclosed in Figs. 1, 2 and 3.

In the modification shown in Fig. 4, the casing element 41 comprises a body portion in the form of a tubular pipe element 42 having associated therewith suitably perforated flanges 43 and 45 for connection to adjacent sections of a pipe line. As shown in the drawing, the flange 45 is integral with the body portion 42, whereas the flange 43 is detachably connected thereto, as by being threaded to the upper end thereof. The tubular body portion 42 is of such internal diameter as to receive with a comparatively close fit a section of transparent glass tubing 46 the lower end of which is seated upon a shouldered portion 47, a flexible washer 48 being inserted between the shoulder and the lower end of the glass tube. The glass tube 46 is held in position against an interior shoulder 49 on the upper flange 43, a flexible washer 50 being inserted between the upper end of the glass tube and the shoulder 49 of the flange, the glass tube being clamped in position by screwing the flange 43 into operative position relative to the body portion 42. An indicating element 51 is disposed within the casing and includes a plunger 52 having a comparatively close fit with a counter-bored portion 53 of the flange 45 of the casing. The plunger 52 is cone-shaped at its lower end, as shown in the drawing, so as to coöperate with the upper end of the counter-bored portion 53 of the casing and thus vary the fluid opening therethrough. Mounted upon the upwardly extending stem 54 of the plunger 53 is a turbine motor element 56 the vanes 57 of which have a comparatively close fit in the glass tube 46, and hence are guided to a considerable extent by the tube. Associated with the upper end of the casing, as by being held between the upper end of the glass tube 46 and the shouldered portion of the flange 43, is a stop 58, here shown as an apertured disk having a solid part opposite the upper end of the stem 54 for engagement therewith to limit the upward movement of the indicating element.

While the guiding of the indicating element 51 may be readily secured through the guiding function of the glass tube 46 on the vanes 57 of the motor element, nevertheless, if desired, an additional guide for the stem 54 may be provided in the form of an apertured guiding bushing 59, and this bushing may readily be held in position between the lower end of the glass tube 46 and the shoulder 47 of the casing element.

An intermediate portion of the casing element 42 is apertured preferably at spaced points as indicated at 61, to permit observation of the guide element through the transparent tube 46.

The normal position of the indicating element, that is, when there is no flow of fluid through the pipe line, is that shown in full lines in the drawings, wherein the upper edge of the motor element 56 is preferably behind the unapertured portion of the casing part 42 and hence is invisible, this indicating that there is no flow of fluid through the conduit. In this position, the outer edges of the vanes 57 may rest on the washer 48. On the occurrence of flow through the pipe line, the pressure of the fluid, acting against the under side of the plunger 52, is sufficient to raise the plunger out of the counter-bored portion of the casing and the turbine element mounted on the stem 56 to the position indicated in dotted lines, wherein flow of fluid is permitted about the plunger, and the turbine element is visible through the apertured portion of the casing. It will be noted that, through the formation of the turbine vanes, the fluid passing therethrough is effective to rotate the indicating element, thus giving a double indication, that is, movement of the turbine to a visible position constitutes one indication, and rotation of the indicating element by the fluid, another indication. Further, the rate of rotation is a considerable indication of the rate and amount of flow through the conduit. It will be apparent that the edge portions of the vanes or any suitable part of the indicating element, may have more distinctly visible indicating provisions, of any desired form, to exercise a comparatively great visual appeal to a person.

Figure 5:
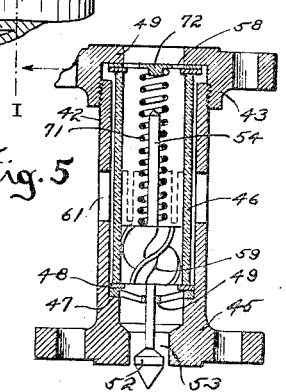
Fig. 5 is a view similar to Fig. 4, showing a modification of the devices of Figs. 1, 2, 3 and 4.

While in the particular embodiment shown in Fig. 4, the weight of the indicating element alone is relied upon for biasing and returning such element to its normal position, indicated in full lines, and hence its greatest utility is in a vertical pipe line where the flow is upward; nevertheless, it will be apparent that by using spring means for urging the indicator to the inoperative position shown in the drawings, the indicator may be readily used with desirable results in either horizontal or inclined pipe lines to indicate flow therethrough in either direction. A structure embodying this modification is shown in Fig. 5. The spring for urging the indicator to non-indicating position is designated 71, the upper end of the spring being positioned in any suitable manner, as by means of a seating projection, indicated at 72, preferably formed integral with the apertured disk or washer 58. However, the spring may be positioned wholly through the guiding effect of the stem 54 of the indicator, the upper end of the spring merely bearing against the flat underside of the imperforate portions of the disk 58.

It should be understood that it is not desired that the invention claimed be limited to the exact details of construction shown and described, for obvious modifications may occur to a person skilled in the art.

It is claimed and desired to secure by Letters Patent:

1. A flow indicator, comprising a casing having openings affording a flow of fluid therethrough and provided with a transparent window affording a view of the interior of the casing, and an indicating element within said casing having an indicating portion biased to a non-indicating position and movable to an indicating position in response to flow of fluid through said casing, said indicating element comprising a part in the path of flow through said casing and capable of offering substantial obstruction to such flow, said latter part being coöperative with a portion of said casing to permit flow of variable amount through said casing when said indicating portion is in indicating position.

2. A flow indicator, comprising a casing having a flow opening therethrough and provided with a transparent window affording a view of the interior of the casing, and an indicating element within said casing biased to non-indicating position and movable to indicating position in response to flow of fluid through said casing, said indicating element comprising a part in the path of flow through said casing and normally obstructing substantial flow therethrough and movable to a position wherein it permits flow of variable amount through said casing, and a motor element rotatable by fluid passing through the casing and visible through said window when the indicating element is in indicating position.

3. A flow indicator, comprising a casing having a flow opening therethrough and provided with a transparent window affording a view of the interior of the casing, an indicating element within said casing biased to a non-indicating position and movable to indicating position in response to flow of fluid through said casing and means associated with said indicating element and operative only when the latter is in indicating position to variably control the amount of fluid passing through said casing.

4. A flow indicator, comprising a casing having openings affording a flow of fluid therethrough and provided with a transparent window affording a view of the interior of the casing, an indicating element within said casing having a portion thereof visible through said window, said indicating element being biased to a non-indicating position and movable to an indicating position in response to flow of fluid through said casing, and means for guiding said indicating element in its movement, said indicating element being provided adjacent one end with a portion coöperative with a portion of the casing to permit a flow of variable amount through said casing when said indicating element is in indicating position.

5. A flow indicator, comprising a casing having inlet and outlet openings providing a passage therethrough, one end of said casing being provided with a removable apertured element operative to connect said casing in fluid communication with a conduit, a tubular transparent window removably secured in position between the body portion of said casing and said removable element and an indicating element within said casing biased to a non-indicating position, said indicating element having a piston-like portion coöperative with fluid passing through said casing to move said indicating element to an indicating position wherein the said indicating element is visible through said window.

6. A flow indicator, comprising a casing having an inlet and an outlet and a body portion with a flow opening therethrough, said inlet, outlet and flow opening being in substantial alinement, an element having a transparent window removably secured in position relative to said body portion, and an indicating device within said tubular element biased to a position wherein it is invisible through said window and movable with its axis in substantial alinement with the axis of said outlet, said indicating device being movable to a position wherein it is visible through said window and in response to the flow of fluid through said casing.

7. A flow indicator, comprising a casing having a flow opening therethrough and longitudinally alined inlet and outlet portions formed for connection to sections of conduit and a transparent window affording a view of the interior of the casing, an indicating element within said casing comprising a portion normally invisible through said window and movable past said window in response to flow of fluid through said casing, guiding means for said indicating element comprising a stem, and a guide bushing with which said stem coöperates, a spring for biasing said indicating element to non-indicating position and operatively associated with said stem and said guide bushing, and an element effective to substantially obstruct the passage through said casing when said indicating element is in non-indicating position and movable in response to the flow of fluid through said casing to cause movement of said indicating element to indicating position.

8. A flow indicator, comprising a casing having a flow opening therethrough and provided with a transparent window affording a view of the interior of the casing, and an indicating element within said casing biased to non-indicating position and movable to indicating position in response to flow of fluid through said casing, said indicating element comprising a part in the path of flow through said casing and normally obstructing substantial flow therethrough and movable to a position wherein it permits flow of variable amount through the casing, and a motor element associated with said flow-obstructing part and located at the rear thereof, said motor element being rotatable by fluid passing through said casing and being visible through said window when said indicating element is in indicating position.

9. A flow indicator, comprising a casing having a substantially uni-directional flow opening therethrough and longitudinally alined inlet and outlet portions formed for connection to adjacent sections of conduit, and a transparent window affording a view of the interior of said casing, and an indicating element within said casing biased to non-indicating position and movable longitudinally in the direction of flow through said casing to indicating position wherein it is visible through said window.

10. A flow indicator, comprising a casing having a flow opening therethrough and provided with a transparent window affording a view of the interior of said casing, and an indicating element within said casing biased to non-indicating position and movable to indicating position in response to flow of fluid through said casing, said indicating element having associated therewith a motor element operative to effect rotation of said indicating element when the latter is in indicating position and visible through said window.

11. A flow indicator, comprising a casing having a substantially uni-directional flow opening therethrough and inlet and outlet portions formed for connection to adjacent sections of conduit, and a transparent window affording a view of the interior of said casing, and an indicating element within said casing biased to a position corresponding to absence of substantial flow through said casing and movable longitudinally in the direction of flow through said casing to indicating position wherein it is visible through said window.

In testimony whereof the signature of the inventor is affixed hereto.

ARTHUR J. BROWN.